(12) United States Patent
Ferrara, Jr.

(10) Patent No.: US 10,598,685 B2
(45) Date of Patent: *Mar. 24, 2020

(54) PORTABLE HUNTING DEVICE FOR GENERATING SCENTED VAPOR

(71) Applicant: Arcus Hunting, LLC, Covington, GA (US)

(72) Inventor: Daniel A. Ferrara, Jr., Morris, CT (US)

(73) Assignee: Arcus Hunting, LLC, Covington, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/173,632

(22) Filed: Oct. 29, 2018

(65) Prior Publication Data

US 2019/0064200 A1 Feb. 28, 2019

Related U.S. Application Data

(63) Continuation of application No. 15/991,795, filed on May 29, 2018, now Pat. No. 10,114,036, which is a continuation of application No. 14/992,394, filed on Jan. 11, 2016, now Pat. No. 9,989,552.

(60) Provisional application No. 62/177,796, filed on Mar. 25, 2015.

(51) Int. Cl.
| | |
|---|---|
| *G01P 13/00* | (2006.01) |
| *G01P 13/02* | (2006.01) |
| *A01M 31/00* | (2006.01) |
| *B05B 11/06* | (2006.01) |
| *F22B 1/28* | (2006.01) |

(52) U.S. Cl.
CPC ......... *G01P 13/0093* (2013.01); *A01M 31/00* (2013.01); *A01M 31/008* (2013.01); *B05B 11/06* (2013.01); *F22B 1/28* (2013.01); *F22B 1/284* (2013.01); *G01P 13/02* (2013.01)

(58) Field of Classification Search
CPC ..... G01P 13/0093; G01P 13/02; A01M 31/00; A01M 31/008; F22B 1/284; B05B 11/06
See application file for complete search history.

(56) References Cited

U.S. PATENT DOCUMENTS

| | | | |
|---|---|---|---|
| 2,609,230 | A | 9/1952 | Raleigh |
| 3,046,192 | A | 2/1959 | Bilyeu |
| 3,112,645 | A | 12/1963 | Glass |
| 3,200,819 | A | 8/1965 | Gilbert |
| 3,207,441 | A | 9/1965 | Schreiber |
| 3,658,719 | A | 4/1972 | McConnaughey |
| 3,918,640 | A | 11/1975 | Piccino et al. |
| 4,159,672 | A | 7/1979 | Garguilo et al. |

(Continued)

OTHER PUBLICATIONS

Bow Staff, Cirrus Hunt Vape article, Bowhunting.com Newsletter, Jan. 5, 2016, 3 pages, https://www.bowhunting.com/blog/2016/01/05/cirrus-hunt-vape/.

(Continued)

*Primary Examiner* — Nimeshkumar D Patel
*Assistant Examiner* — Tania Courson
(74) *Attorney, Agent, or Firm* — Hovey Williams LLP; Kameron D. Kelly (57) ABSTRACT

A portable device for use in hunting. The portable device uses ultrasonic vibrations to discharge a scented vapor stream into the atmosphere. The vapor stream can carry a scent for attracting animals and/or disguising human scent.

32 Claims, 10 Drawing Sheets

(56) References Cited

U.S. PATENT DOCUMENTS

| | | | |
|---|---|---|---|
| 4,163,038 A | 7/1979 | Nishimura et al. | |
| 4,666,638 A | 5/1987 | Baker et al. | |
| 4,742,960 A | 5/1988 | Bustillo et al. | |
| 4,771,563 A | 9/1988 | Easley | |
| 4,937,431 A | 6/1990 | Jameson et al. | |
| 4,953,763 A * | 9/1990 | Kierum | A01M 31/008 119/72.5 |
| 5,094,024 A | 3/1992 | Daniels | |
| 5,094,025 A | 3/1992 | Daniels | |
| 5,117,821 A * | 6/1992 | White | A41D 13/11 128/206.15 |
| 5,161,646 A | 11/1992 | Aurich et al. | |
| 5,186,118 A | 2/1993 | Stinson | |
| 5,305,541 A | 4/1994 | Simpson | |
| 5,307,584 A | 5/1994 | Jarvis | |
| 5,359,801 A | 11/1994 | Mattucci et al. | |
| 5,429,271 A | 7/1995 | Porter | |
| 5,547,616 A | 8/1996 | Dancs et al. | |
| 5,622,314 A | 4/1997 | Eason | |
| D386,256 S | 11/1997 | Turpin | |
| 5,744,106 A | 4/1998 | Eagle | |
| 5,832,648 A | 11/1998 | Malone | |
| 5,896,692 A | 4/1999 | Collora et al. | |
| 5,901,490 A | 5/1999 | Lush | |
| 5,914,119 A | 6/1999 | Dawson | |
| 5,970,643 A | 10/1999 | Gawel, Jr. | |
| 6,038,805 A | 3/2000 | Smidtke | |
| 6,050,016 A | 4/2000 | Cox | |
| 6,240,248 B1 | 5/2001 | Fore | |
| 6,241,161 B1 | 6/2001 | Corbett | |
| 6,296,196 B1 | 10/2001 | Denen et al. | |
| 6,421,502 B1 | 7/2002 | Aronie et al. | |
| 6,439,474 B2 | 8/2002 | Denen | |
| 6,443,146 B1 | 9/2002 | Voges | |
| 6,443,434 B1 | 9/2002 | Prather | |
| 6,592,104 B2 | 7/2003 | Cox | |
| 6,610,254 B1 | 8/2003 | Furner et al. | |
| 6,655,604 B2 | 12/2003 | Tuttobene, Jr. | |
| 6,745,950 B1 | 6/2004 | Longo | |
| 6,820,363 B1 | 11/2004 | Averette, Jr. | |
| 6,983,103 B1 | 1/2006 | Parcher | |
| 7,133,605 B2 | 11/2006 | Niemeyer | |
| 7,290,445 B2 | 11/2007 | Kirollos et al. | |
| 7,341,208 B2 * | 3/2008 | Peters | B05B 1/3436 239/11 |
| 7,377,493 B2 | 5/2008 | Thomas | |
| 7,419,102 B2 | 9/2008 | Harris, Jr. | |
| 7,617,993 B2 | 11/2009 | Srinivasan et al. | |
| 7,721,597 B2 | 5/2010 | Onishi | |
| 7,765,863 B1 | 8/2010 | Woolsey | |
| 7,784,712 B2 | 8/2010 | Wang et al. | |
| 7,832,410 B2 * | 11/2010 | Hon | A24F 47/008 131/273 |
| 7,845,359 B2 | 12/2010 | Montaser | |
| 7,874,207 B2 * | 1/2011 | Galley | G01P 13/02 73/170.06 |
| 7,883,677 B2 * | 2/2011 | Palozzi | A01M 31/008 126/248 |
| 7,954,730 B2 | 6/2011 | Ng | |
| 7,960,894 B2 | 6/2011 | Duru | |
| 7,997,280 B2 | 8/2011 | Rosenthal | |
| D649,630 S | 11/2011 | Kaplan et al. | |
| 8,156,944 B2 | 4/2012 | Han | |
| D661,835 S * | 6/2012 | McDonough | D27/141 |
| 8,320,300 B2 | 11/2012 | Nylander et al. | |
| 8,424,379 B2 | 4/2013 | Bibby | |
| 8,490,889 B2 | 7/2013 | Rydbom | |
| 8,727,234 B2 | 5/2014 | Haran | |
| 8,897,628 B2 * | 11/2014 | Conley | A24F 47/008 392/386 |
| 8,910,640 B2 | 12/2014 | Sears et al. | |
| 9,320,300 B2 | 4/2016 | Hon | |
| 9,426,977 B1 | 8/2016 | Wynalda, Jr. | |
| 9,533,323 B2 | 1/2017 | Sauzade | |
| 9,585,981 B2 * | 3/2017 | Wynalda, Jr. | F22B 1/284 |
| 9,739,796 B2 * | 8/2017 | Ferrara, Jr. | G01P 13/0093 |
| 9,841,433 B2 | 12/2017 | Norris et al. | |
| 9,894,893 B2 * | 2/2018 | Wynalda, Jr. | A01M 31/008 |
| D812,706 S * | 3/2018 | Ferrara, Jr. | G01P 13/0093 D22/108 |
| 9,980,478 B2 | 5/2018 | Roebuck | |
| 9,989,552 B2 * | 6/2018 | Ferrara, Jr. | G01P 13/0093 |
| 10,114,036 B2 * | 10/2018 | Ferrara, Jr. | G01P 13/0093 |
| 10,188,094 B2 * | 1/2019 | Wynalda, Jr. | A01M 31/008 |
| 10,264,783 B2 * | 4/2019 | Jespersen | A01N 25/04 |
| 10,267,821 B2 * | 4/2019 | Norris | G01P 13/02 |
| D848,568 S * | 5/2019 | Wynalda, Jr. | D22/112 |
| 10,278,382 B2 * | 5/2019 | Wynalda, Jr. | A01M 1/2072 |
| 2003/0020185 A1 | 1/2003 | Cox | |
| 2004/0221841 A1 | 11/2004 | Herschel | |
| 2008/0098952 A1 | 5/2008 | Healy et al. | |
| 2008/0244954 A1 | 10/2008 | Shannon | |
| 2009/0065600 A1 | 3/2009 | Tranchant et al. | |
| 2009/0114228 A1 | 5/2009 | Kirschner | |
| 2009/0260271 A1 | 10/2009 | Bailey | |
| 2009/0277972 A1 | 11/2009 | Kennon et al. | |
| 2009/0277973 A1 | 11/2009 | Kennon | |
| 2010/0031968 A1 | 2/2010 | Sheikh et al. | |
| 2010/0059601 A1 | 3/2010 | Bankers et al. | |
| 2010/0126505 A1 | 5/2010 | Rinker | |
| 2010/0224119 A1 | 9/2010 | Morris | |
| 2010/0242974 A1 | 9/2010 | Pan | |
| 2010/0322990 A1 * | 12/2010 | Burke | A01N 25/04 424/405 |
| 2011/0005535 A1 | 1/2011 | Xiu | |
| 2011/0011396 A1 | 1/2011 | Fang | |
| 2011/0036346 A1 | 2/2011 | Cohen et al. | |
| 2011/0315786 A1 | 12/2011 | Kambayashi | |
| 2012/0111347 A1 | 5/2012 | Hon | |
| 2012/0272968 A1 | 11/2012 | Kirschner | |
| 2014/0290650 A1 | 10/2014 | Ivey | |
| 2014/0352630 A1 | 12/2014 | Messina | |
| 2014/0361095 A1 | 12/2014 | Haran | |
| 2015/0027459 A1 | 1/2015 | Collett | |
| 2015/0189855 A1 | 7/2015 | Norris | |
| 2015/0257449 A1 | 9/2015 | Gabbay | |
| 2015/0359230 A1 | 12/2015 | Messina | |
| 2016/0069924 A1 | 3/2016 | Norris et al. | |
| 2016/0143364 A1 * | 5/2016 | DePiano | A24F 47/008 392/395 |
| 2016/0174611 A1 * | 6/2016 | Monsees | H05B 3/04 392/387 |
| 2016/0309701 A1 | 10/2016 | DeHaven | |
| 2016/0310624 A1 | 10/2016 | Wynalda, Jr. | |
| 2017/0172137 A1 * | 6/2017 | Wynalda, Jr. | A01M 31/004 |
| 2018/0206478 A1 * | 7/2018 | Wynalda, Jr. | A01M 1/2072 |
| 2019/0110464 A1 * | 4/2019 | Wynalda, Jr. | A01M 1/2077 |
| 2019/0212357 A1 * | 7/2019 | Norris | A01M 31/00 |

OTHER PUBLICATIONS

Webpage of YouTube video dated Jan. 6, 2016, https://www.bowhunting.com/video/cirrus-vape-wind-indicator-2016-ata-show/.

Screenshot of YouTube video dated Jan. 6, 2016, https://www.bowhunting.com/video/cirrus-vape-wind-indicator-2016-ata-show/.

Office Action dated Sep. 28, 2017 for related U.S. Appl. No. 14/992,394, filed Jan. 11, 2016; 15 pages.

* cited by examiner

PORTABLE HUNTING DEVICE FOR GENERATING SCENTED VAPOR

CROSS-REFERENCE TO RELATED APPLICATIONS

This application is a continuation of U.S. patent application Ser. No. 15/991,795 filed May 29, 2018, which is a continuation of U.S. patent application Ser. No. 14/992,394 filed Jan. 11, 2016, which claims benefit under 35 U.S.C. § 119(e) based on U.S. Provisional Application No. 62/177,796 filed on Mar. 25, 2015, the entire disclosures of which are incorporated herein by reference.

FIELD OF THE INVENTION

The present invention relates generally to devices that allow a user to visually determine wind currents, drafts, and other types of airflow. Such devices are used, for example, by hunters, golf players, sailors, and HVAC technicians.

BACKGROUND OF THE INVENTION

Devices for visualizing wind currents and other types of airflow are known. In a common arrangement, a resiliently deformable bottle carries a fine powder material, and the user squeezes the bottle to discharge a puff of air including the visible powder material into the atmosphere. The powdered stream of air may be viewed by the user as it is acted upon by wind currents or other localized airflow, thereby providing the user with a visual indication of the direction and strength of such airflow. Examples of powder discharge visualization devices are described in U.S. Pat. No. 5,186,118 (Stinson); U.S. Pat. No. 7,765,863 (Woolsey); and U.S. Pat. No. 8,424,379 (Bibby). A disadvantage of this type of device is that the powder is susceptible to clumping caused by humid atmospheric conditions, and this may render the device unusable. Powder discharge devices are also messy to reload.

Electronic wind gauges are also known wherein a liquid is vaporized by energizing a heating element. Examples of this type of wind gauge are disclosed in U.S. Pat. No. 2,311,199 (Astradsson) and U.S. Pat. No. 4,326,119 (Swiatosz). Known electronic wind gauges are structurally complex and do not provide an organized stream of air for carrying the vapor into the atmosphere as a well-defined line of vapor indicating a reference direction. Unintended discharge may also be a problem if the electronic device is accidentally turned on when a user is reaching for other equipment, such as a gun or ammunition.

What is needed is a reliable, compact, easily portable wind tracking device that discharges a well-defined line of visible vapor and is not susceptible to accidental discharge.

SUMMARY OF THE INVENTION

The present invention provides a compact portable device for checking wind direction and strength by discharging a visible vapor stream into the atmosphere. The vapor stream is discharged in a well-defined reference direction, and the effects of local wind or air currents on the vapor stream may be visually observed by a user to qualitatively judge direction and strength of the wind or air currents. The vapor stream may carry a scent, for example a scent that attracts animals and/or disguises human scent.

In some embodiments, the device generally comprises a power source, a vessel including an internal plenum chamber for storing a volume of air, a reservoir containing a vaporizable agent, a vaporizing element associated with the vaporizable agent, and a pressure switch activated by airflow. The vessel is deformable to generate a flow of air, and the pressure switch is arranged in the flow of air and is operated by the flow of air to selectively connect the power source to the vaporizing element, thereby energizing the vaporizing element to vaporize at least a portion of the vaporizable agent. The flow of air also carries the vapor into the atmosphere as a visible vapor stream flowing in a reference direction. The vaporizing agent may be a glycol-based fluid, and the vaporizing element may be a heating element of piezoelectric element arranged in association with the vaporizable agent.

The reservoir and the vaporizing element may be carried in a cartridge that is removably mounted on the device. The reservoir may have a vapor discharge passage defining the reference direction of the vapor stream. The device may further comprise a removable cap for preventing airflow from the plenum chamber of the vessel to the atmosphere when the device is not in use, wherein the cap includes an internal stopper arranged to seal the vapor discharge passage. The vessel may be embodied as a hollow bladder made of resiliently deformable material, or as a bellows or piston and cylinder.

Other embodiments operate in a similar manner, but comprise various alternative means for generating a flow of air or other gas to operate the switch and/or carry generated vapor into the atmosphere. For example, alternative embodiments are disclosed that use a fan, a user's exhalation, and a container of pressurized gas, respectively, to generate gaseous flow.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

FIGS. 1 through 8 show an apparatus 10 formed in accordance with a first embodiment of the present invention. Apparatus 10 is a portable hand-held device operable by a user to visualize air movement. Apparatus 10 has utility for hunters, golf players, sailors, military personnel, and others seeking to determine wind direction and strength by visual tracking. Apparatus 10 also has utility for heating and cooling technicians and energy use auditors seeking to visualize flow through air ducts and identify leaky doors, windows, etc. in homes and buildings.

Apparatus 10 generally comprises a power source 12, a vessel 14, a reservoir 16, a vaporizing element 18, and a switch 20. Reservoir 16 contains a vaporizable agent 22, for example propylene glycol, vegetable glycerin, or other organic compound. Vaporizing element 18 is associated with vaporizable agent 22 and may be energized by power source 12 to vaporize vaporizable agent 22. Switch 20 is operable to connect and disconnect vaporizing element 18 to and from power source 12. Vessel 14 includes an internal plenum chamber 24 for storing a volume of air, and is deformable to generate a flow of air. Switch 20 is a pressure-sensitive switch arranged such that the flow of air generated by deforming vessel 14 operates switch 20 to temporarily connect vaporizing element 18 to power source 12. As may be understood, vaporizing element 18 is briefly energized to vaporize some of the vaporizable agent 22, thereby producing visible vapor. The visible vapor is carried by the flow of air into the atmosphere as a thin vapor stream 26 flowing in a reference direction D as it leaves apparatus 10.

Figures 1, 2, 3:
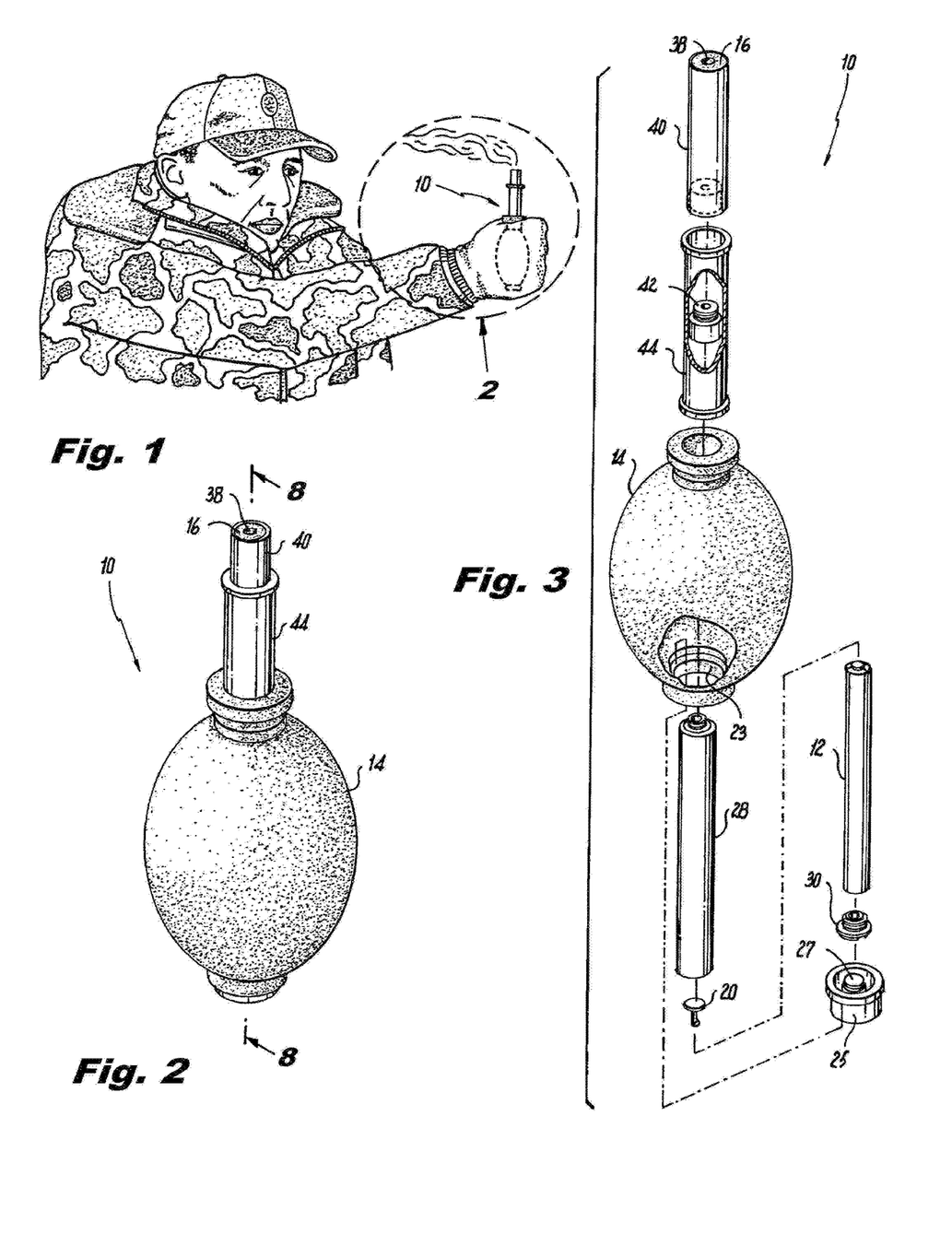
FIG. 1 is a perspective view showing an air movement visualization apparatus formed in accordance with a first embodiment of the present invention being used by hunter.
FIG. 2 is a perspective view of the air movement visualization apparatus shown in FIG. 1.
FIG. 3 is an exploded perspective view of the air movement visualization apparatus shown in FIG. 1.
Figures 4, 5:
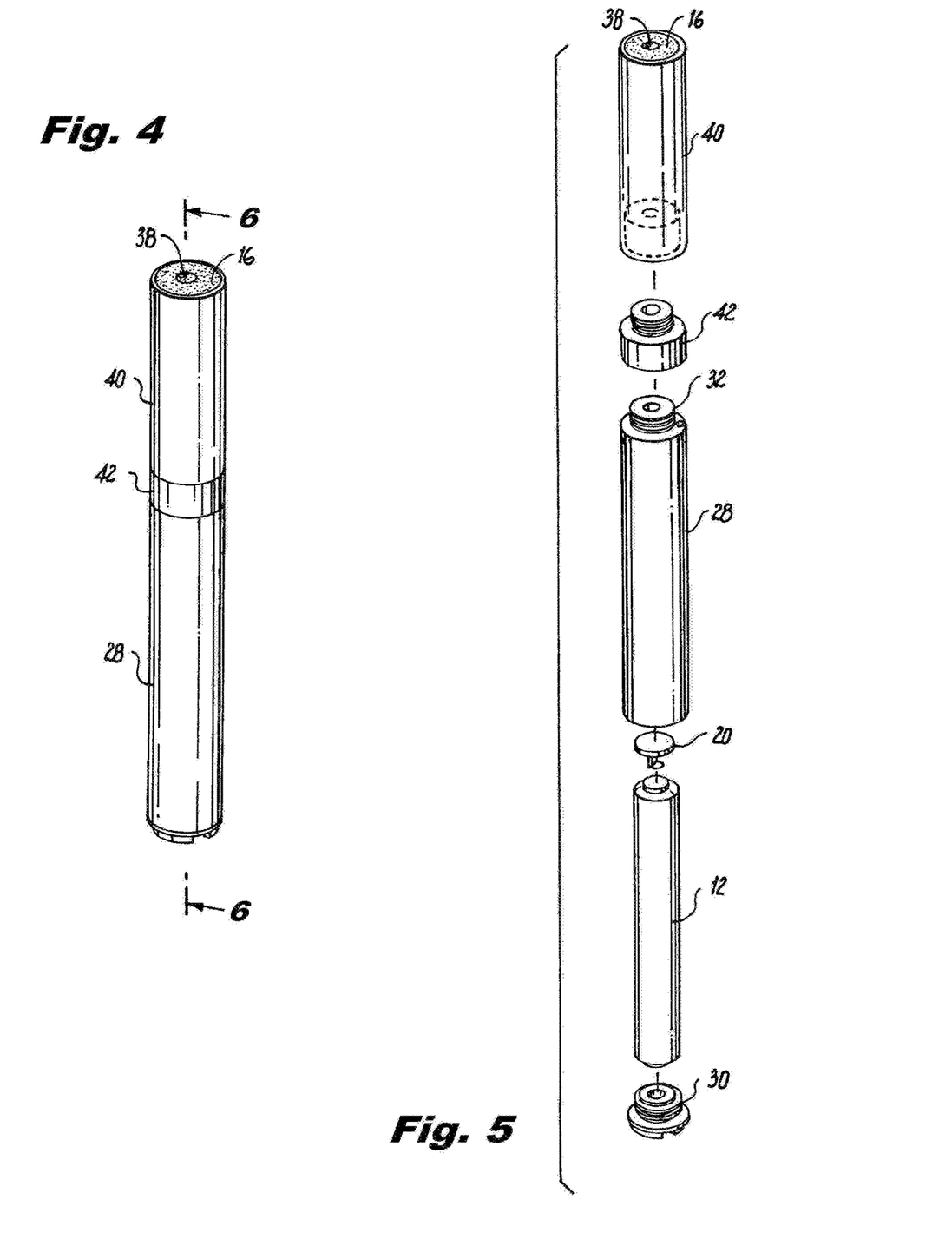
FIG. 4 is a perspective view of a battery housing and vapor cartridge subassembly of the apparatus shown in FIG. 1.
FIG. 5 is an exploded perspective view of the subassembly shown in FIG. 4.
Figure 6:
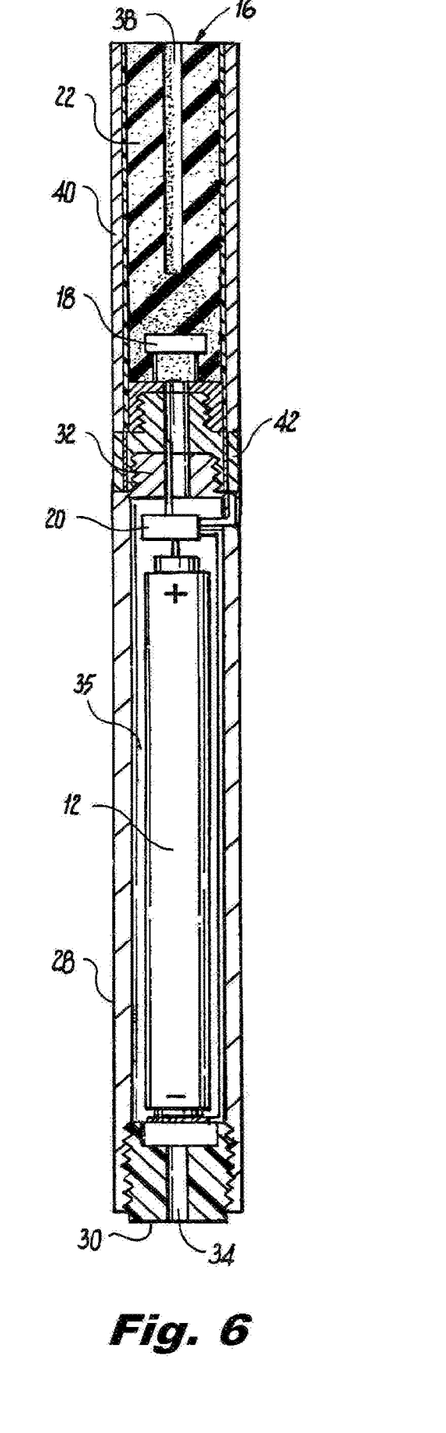
FIG. 6 is a cross-sectional view of the subassembly taken generally along the line 6-6 in FIG. 4.

Power source 12 may include one or more batteries. The batteries may be rechargeable (e.g. lithium ion, nickel-metal hydride, rechargeable alkaline) or non-rechargeable (e.g. disposable alkaline). As shown in FIGS. 5 and 6, power source 12 may be held within an elongated tubular battery housing 28 having a removable base 30 threadably received at a bottom end of the housing and a threaded mating portion 32 at a top end of the housing. Base 30 may be removed for installing and removing power source 12. Base 30 includes an air inlet passage 34 for allowing air to flow from plenum chamber 24 into battery housing 28. Mating portion 32 includes an air outlet passage 36 for allowing air to flow out of battery housing 28. Thus, battery housing 28 includes an air duct defined by air inlet passage 34, space 35 between power source 12 and an inner wall surface of housing 28, and air outlet passage 36 by which the flow of air generated by compressible vessel 14 is communicated through housing 28 to pressure switch 20 and then out of the housing. While not shown in relation to the first embodiment, battery housing 28 may have one or more side ports at a location near pressure switch 20 through which air may enter the battery housing from plenum chamber 24 for communication with the pressure switch.

Figure 8:
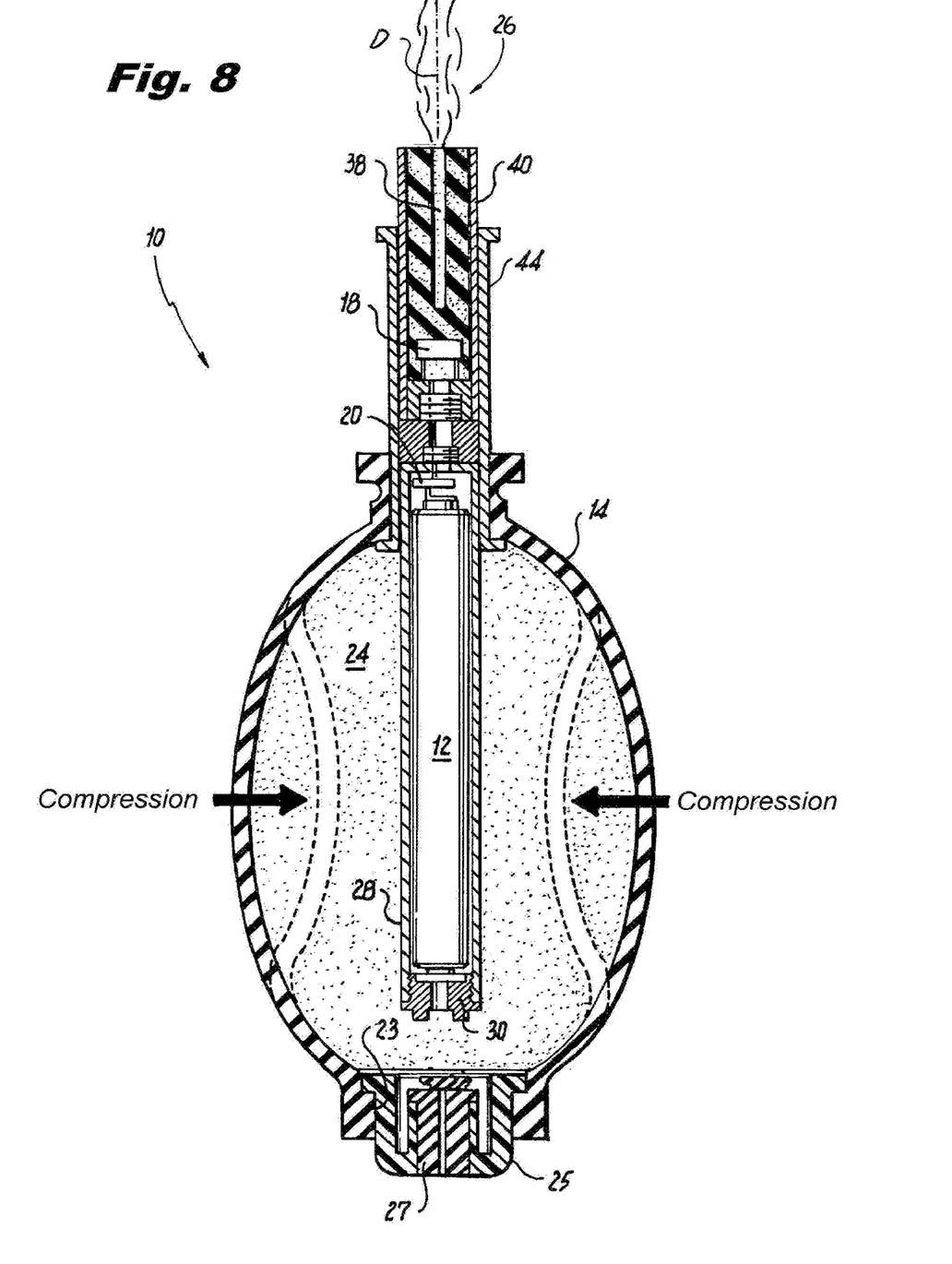
FIG. 8 is a cross-sectional view taken generally along the line 8-8 in FIG. 2 illustrating operation of the apparatus of the first embodiment.

Vessel 14 may be embodied as a bulb or bladder made of resiliently deformable material, for example synthetic rubber. Alternatively, vessel 14 may be embodied as a bellows, or as a piston and cylinder mechanism, that is manually compressible to generate a flow of air. As best seen in FIG. 8, battery housing 28 may be partially or fully received within plenum chamber 24 of vessel 14 to keep apparatus 10 small and compact for portability. In the first embodiment, vessel 14 includes an access opening 23 for allowing access to battery housing 28, and a plug 25 received by the access opening for sealing the access opening. Plug 25 is removable from access opening 23 to permit access to housing 28 and to power source 12 contained by the housing. A check valve 27 is provided through which air enters plenum chamber 24 and through which air cannot exit the plenum chamber. Check valve 27 may be incorporated into plug 25, as shown in FIG. 8, or the check valve may be provided through a wall of vessel 14 at another location.

Reservoir 16 contains a supply of vaporizable agent 22. As used herein, the term "vaporize" and alternative forms thereof have a broad meaning encompassing atomize, aerosolize, and similar processes wherein fluid is physically dispersed in air by application of heat and/or vibration. Vaporizable agent 22 may be a liquid or gel held by an absorbent matrix material that surrounds vaporizing element 18.

Figure 7:
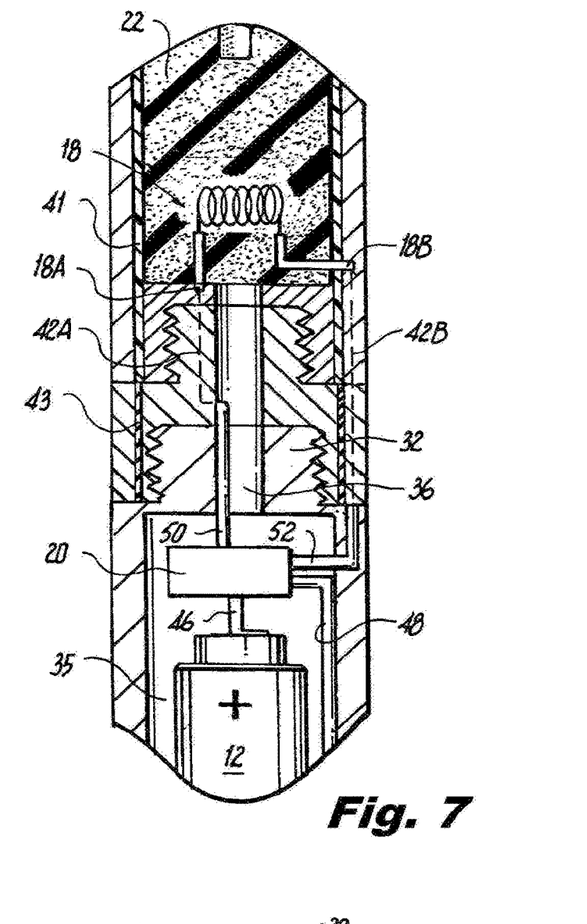
FIG. 7 is an enlarged cross-sectional view of a coupling region of the subassembly shown in FIGS. 4-6.
Figure 7A:
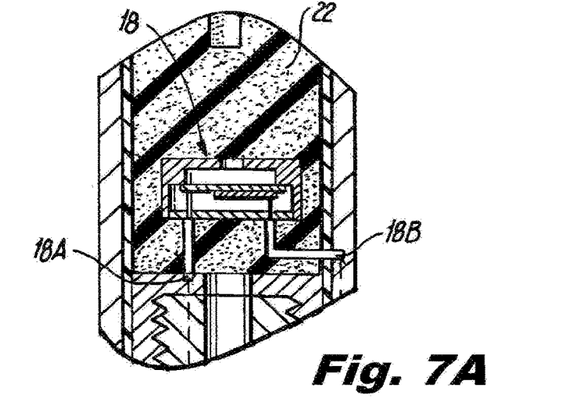
FIG. 7A is an enlarged cross-sectional view showing an alternative vaporizing element of the apparatus.

In FIG. 7, vaporizing element 18 is embodied as a resistive heating element formed of wire. Alternatively, vaporizing element 18 may be embodied as a piezoelectric element as shown in FIG. 7A. When vaporizing element 18 is energized by power source 12, heat or ultrasonic vibrations produced by the vaporizing element act upon vaporizable agent 22 in the vicinity of vaporizing element 18 to generate vapor. Reservoir 16 may be configured to include a vapor discharge passage 38 through which the vapor escapes reservoir 16, wherein the direction of passage 38 defines the reference direction D.

Reservoir 16 and the vaporizing element 18 may be carried in a cartridge 40 removably mounted on apparatus 10. In the first embodiment illustrated by FIGS. 1 through 8, cartridge 40 is removably connected to battery housing 28 by way of a threaded coupler 42. As may be understood, power source 12 and cartridge 40 are independently removable and replaceable, i.e. one may be removed and replaced without removing the other. Upon removal of housing base 30, power source 12 may be removed from housing 28 while cartridge 40 remains connected to housing 28. Cartridge 40 is removable from housing 28 while power source 12 remains in housing 28 by unscrewing cartridge 40 from coupler 42. Apparatus 10 may comprise a rigid tubular receptacle 44 extending from vessel 14, wherein cartridge 40 is slidably received by the receptacle so as to avoid direct frictional contact between cartridge 40 and vessel 14. Receptacle 44 may be metallic, e.g. stainless steel, to reduce friction and facilitate insertion and removal of cartridge 40. Coupler 42 may be fixed to an inner wall surface of receptacle 44. As may be understood, replacement of power source 12 or cartridge 40 is a simple matter that does not require removal of unrelated elements.

Advantageously, threaded coupler 42 may be electrically conductive and may be arranged to electrically connect vaporizing element 18 to pressure switch 20. The electrical connection may be understood by reference to FIGS. 6 and 7. In the depicted embodiment, pressure switch 20 is arranged within battery housing 28 and is connected to the positive and negative terminals of power source 12 by wires 46 and 48, respectively. Switch 20 is also electrically connected to coupler 42 by a positive lead wire 50 contacting a radially inner portion 42A of coupler 42, and by a negative lead wire 52 contacting a radially outer portion 42B of coupler 42. Radially inner and outer portions 42A, 42B are conductive portions electrically insulated from one another by an insulating ring 43. Vaporizing element 18 is connected to pressure switch 20 via coupler 42. When metal cartridge 40 is screwed onto coupler 42, a positive terminal 18A of vaporizing element 18 is electrically connected to inner portion 42A and a negative terminal 18B of vaporizing element 18 is electrically connected to outer portion 42B, thereby forming a circuit including power source 12, pressure switch 20, and vaporizing element 18. An insulating ring 41 is provided in cartridge 40 for electrical insulation between terminals 18A, 18B. Airflow through and/or around battery housing 28 activates pressure switch 20 to temporarily close the switch such that current flows through vaporizing element 18. When the airflow ceases, switch 20 opens to shut off current to vaporizing element 18. Pressure switch 20 may be a commercially available pressure switch or airflow sensor that operates mechanically or has an integrated microprocessor.

Figure 9:
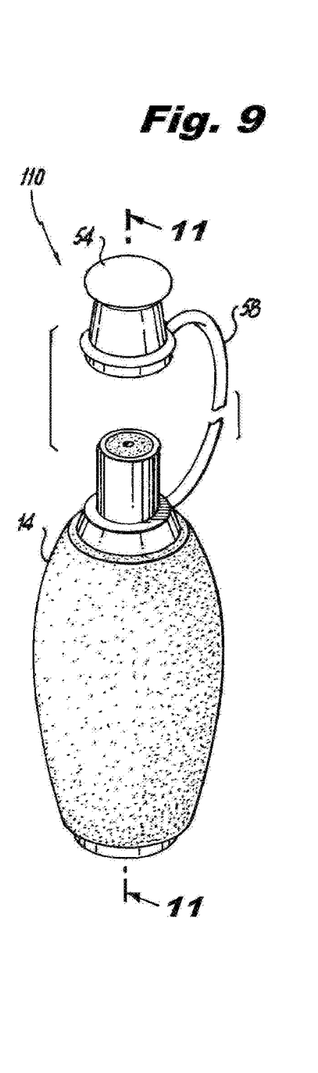
FIG. 9 is a perspective view of an air movement visualization apparatus formed in accordance with a second embodiment of the present invention.
Figures 10, 11:
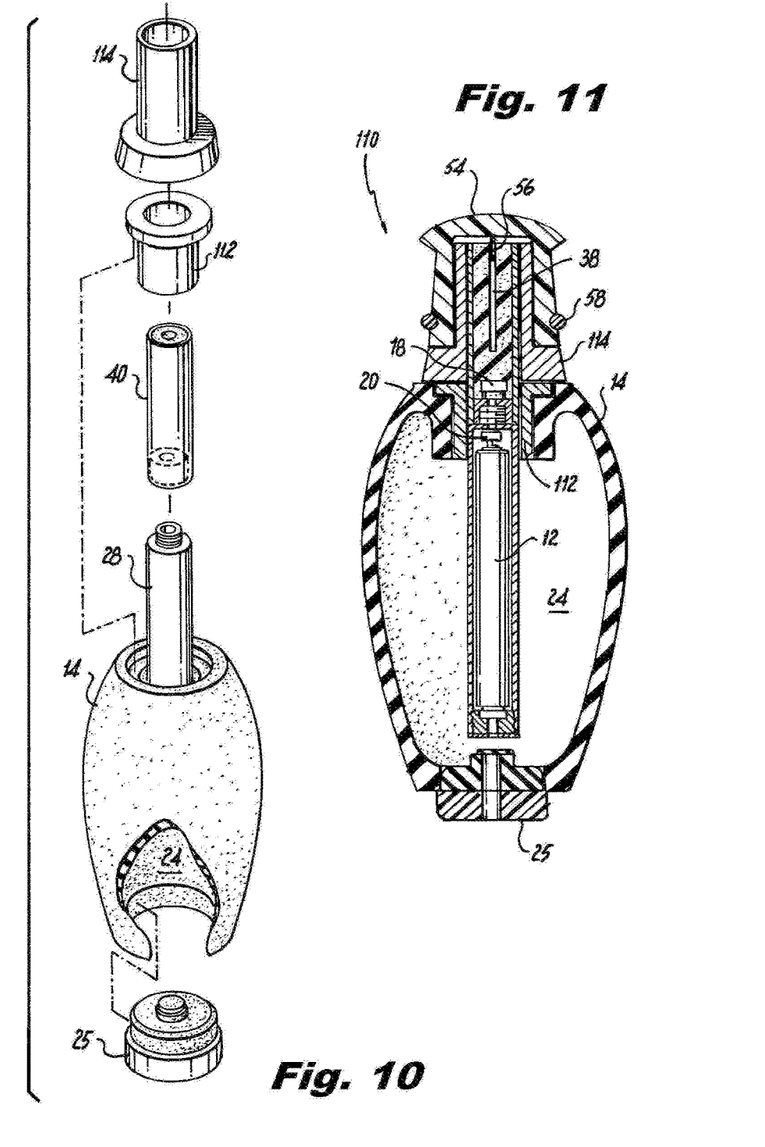
FIG. 10 is an exploded perspective view of the air movement visualization apparatus shown in FIG. 9.
FIG. 11 is a cross-sectional view taken generally along the line 11-11 in FIG. 9.

FIGS. 9 through 11 depict an air movement visualization apparatus 110 formed in accordance with a second embodiment of the present invention. Apparatus 110 operates in a manner similar to apparatus 10 of the first embodiment, but has some structural differences. For example, coupler 42 is omitted and cartridge 40 is removably connected directly to battery housing 28 by threaded connection. Electrical connection of switch 20 to vaporizing element 18 may be provided through the top portion of housing 28.

In apparatus 110 of the second embodiment, battery housing 28 is fixed to a flanged support bushing 112 received through a top opening in vessel 14 such that the battery housing is suspended within plenum chamber 24. A cover sleeve 114 fits over cartridge 40 and is configured to mate with a removable cap 54. Cap 54 prevents airflow from plenum chamber 24 to the atmosphere when the apparatus is not in use. For example, when cap 54 is tightened to form a seal over reservoir 16, air is trapped within plenum chamber 24 such that vessel 14 cannot be accidentally compressed or squeezed to generate a flow of air that may unintentionally operate switch 20. In the illustrated embodiment, cap 54 includes an internal stopper 56 arranged to seal vapor discharge passage 38. Cap 54 may be provided with a lanyard 58 having a first end coupled to cover sleeve 114 or vessel 14 and a second end coupled to the cap to prevent cap 54 from being lost.

Figure 12:
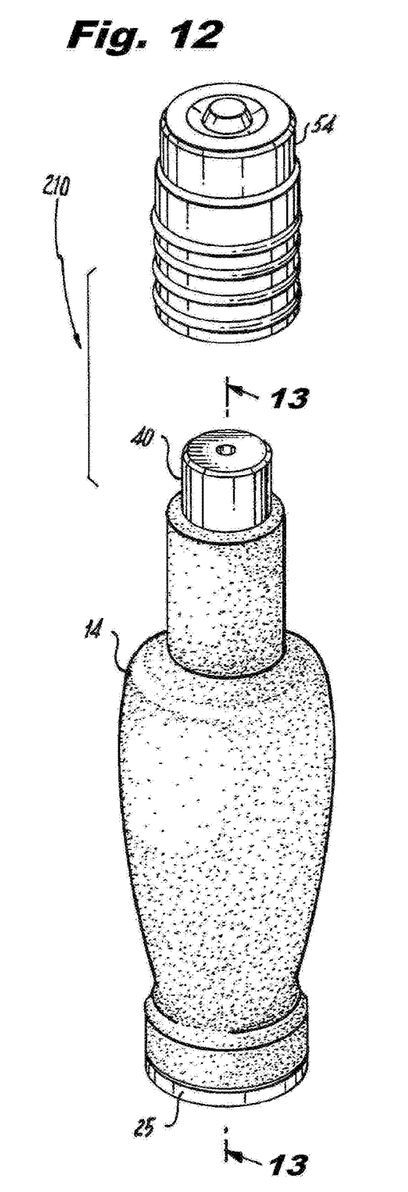
FIG. 12 is a perspective view of an air movement visualization apparatus formed in accordance with a third embodiment of the present invention.
Figure 13:
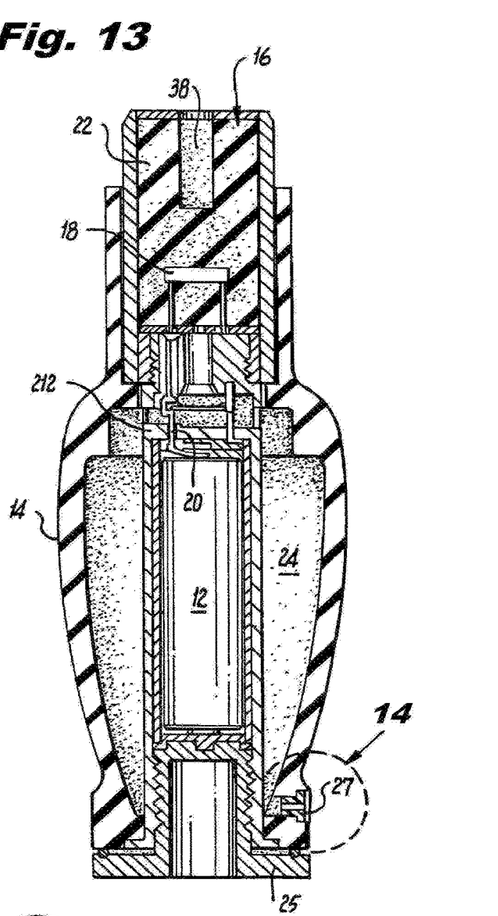
FIG. 13 is a cross-sectional view taken generally along the line 13-13 in FIG. 12.
Figure 14:
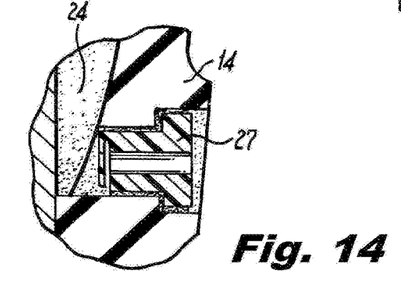
FIG. 14 is an enlarged cross-sectional view showing a one-way check valve of the apparatus shown in FIGS. 12 and 13.

An air movement visualization apparatus 210 formed in accordance with a third embodiment of the present invention is shown in FIGS. 12 through 14. Apparatus 210 operates similar to apparatus 10 of the first embodiment, but incorporates some structural modifications. In apparatus 210, battery housing 28 threadably mates with plug 25, whereby plug 25 acts as a removable base of the housing. Alternatively, plug 25 may be press fitted or snap fitted into the open bottom end of battery housing 28. Access to power source 12 may be gained by unscrewing or otherwise removing plug 25 from battery housing 28 and the bottom of vessel 14. Instead of an air duct extending axially through the length of battery housing 28, a side port 212 is provided through housing 28 such that airflow enters housing 28 near switch 20 to activate the switch. Switch 20 is depicted as a mechanical pressure switch. Check valve 27 is arranged through a side wall of vessel 14, independent of plug 25.

Figure 15:
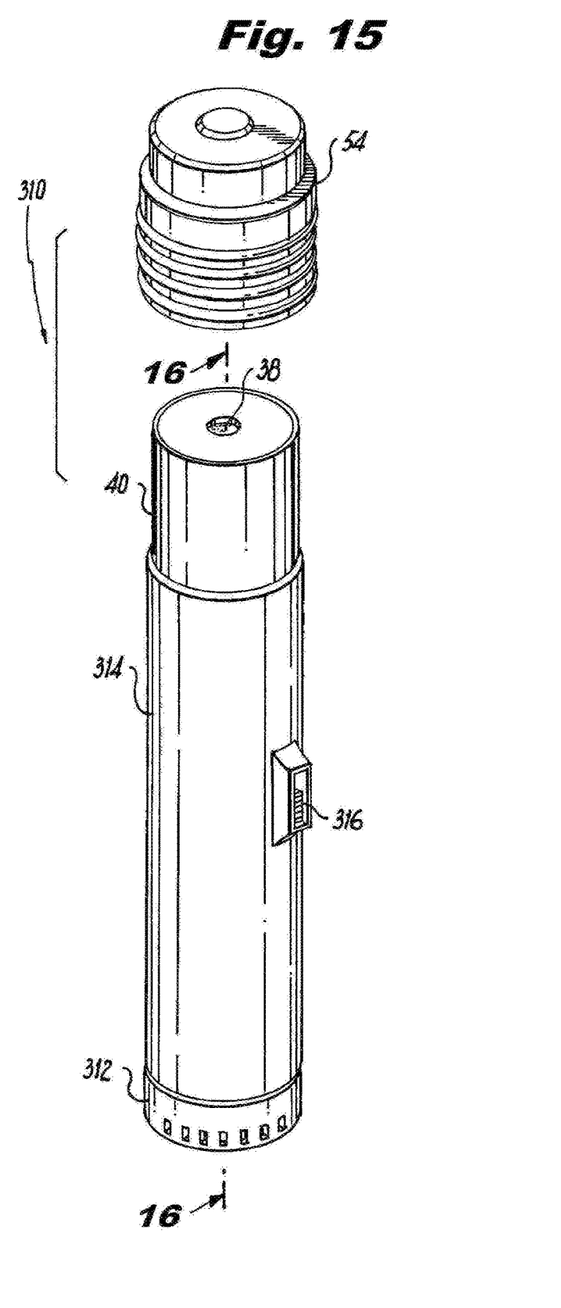
FIG. 15 is a perspective view of an air movement visualization apparatus formed in accordance with a fourth embodiment of the present invention.
Figure 16:
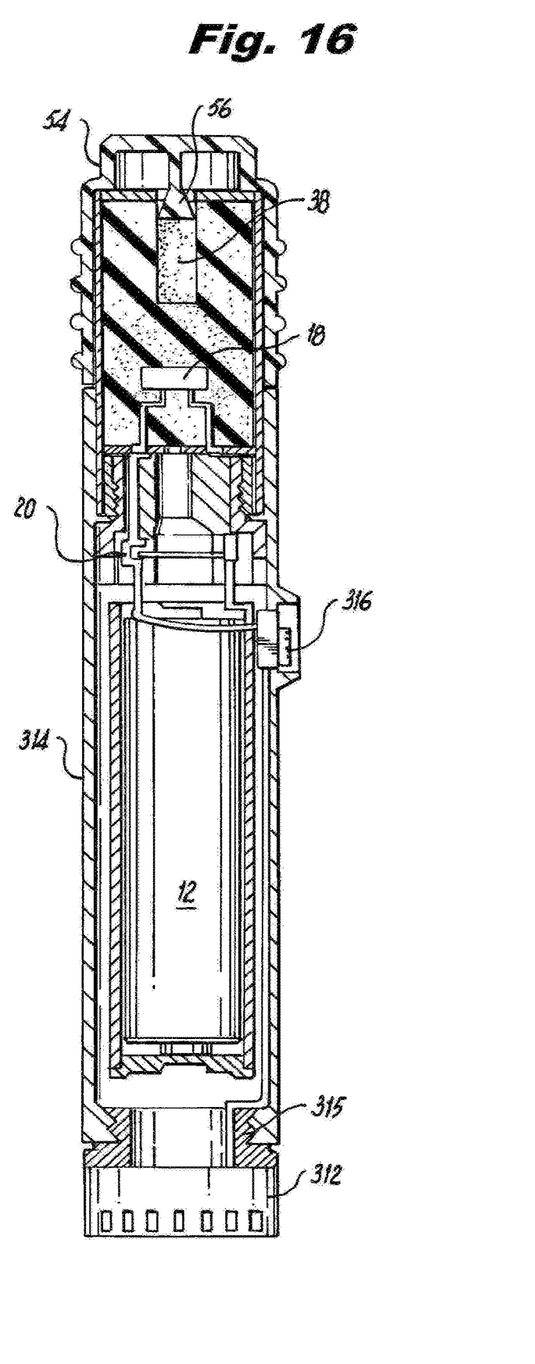
FIG. 16 is a cross-sectional view taken generally along the line 16-16 in FIG. 15.

FIGS. 15 and 16 illustrate an air movement visualization apparatus 310 formed in accordance with a fourth embodiment of the present invention. Apparatus 310 operates in a manner generally similar to the first through third embodiments described above, however it differs from the previous embodiments in that apparatus 310 comprises a small electric fan 312 to generate a flow of air. Fan 312 may be mounted at a base of apparatus shell 314 to provide airflow through battery housing 28, switch 20, and cartridge 40. Fan 312 may be mounted to the base of shell 314 by mating threads 315 so that fan 312 can be unscrewed from shell 314 to permit replacement of power source 12. Apparatus 310 has a manually operated switch 316 for selectively connecting fan 312 to power source 12 to turn the fan on and off. The airflow generated by fan 312 may be used to activate pressure switch 20 to energize vaporizing element 18. Alternatively, manually operated fan switch 316 may be arranged such that it selectively connects both fan 312 and vaporizing element 18 to power source 12, whereby pressure switch 20 may be omitted from apparatus 310. As will be appreciated, the airflow generated by fan 312 carries vapor generated in reservoir 16 through vapor discharge passage 38 and into the atmosphere as a vapor stream flowing in reference direction D. Fan switch 316 may be a momentary switch that shuts off power to fan 312 automatically after a brief predetermined period of time sufficient to cause a stream of vapor to be discharged. Alternatively, fan switch 316 may be an on-off locking switch that remains switched on until the user switches it off.

Figure 17:
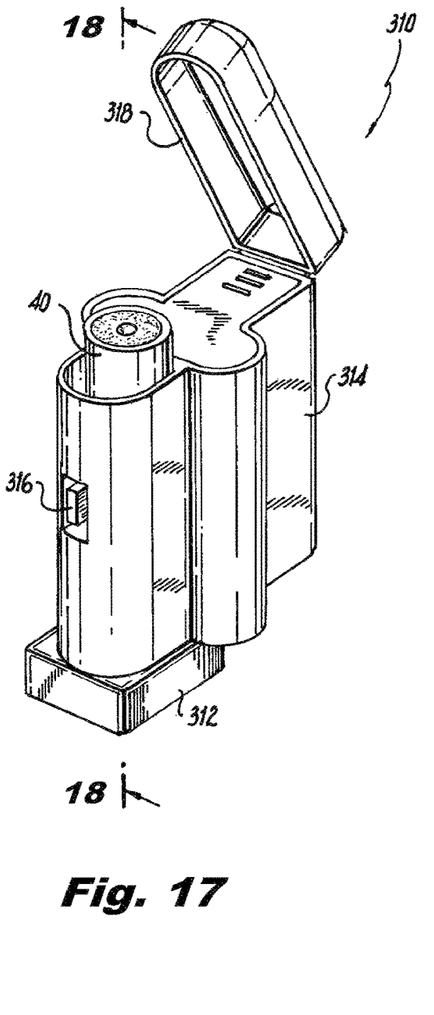
FIG. 17 is a perspective view of an air movement visualization apparatus according to a variation of the fourth embodiment of the present invention.
Figure 18:
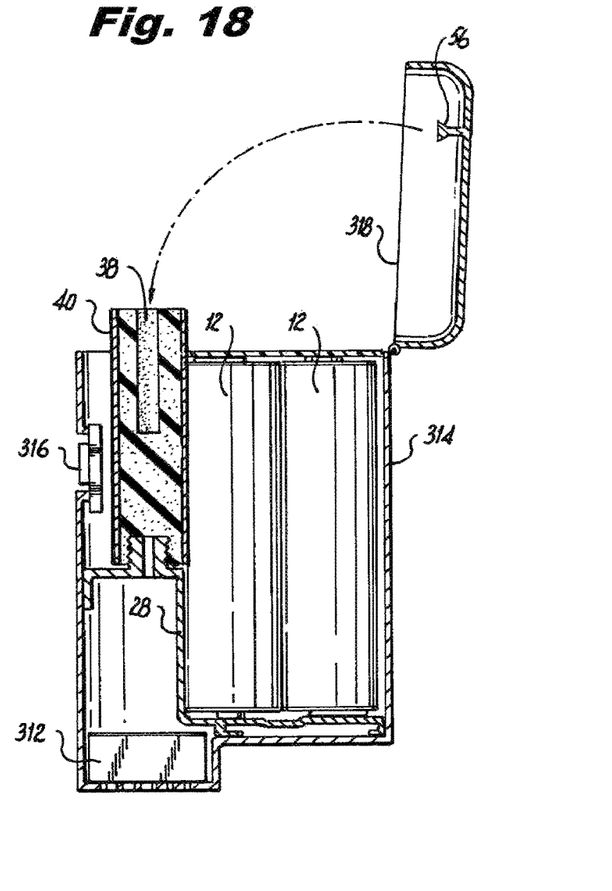
FIG. 18 is a cross-sectional view taken generally along the line 18-18 in FIG. 17.

In a variation of the fourth embodiment depicted in FIGS. 17 and 18, power source 12 may be arranged out of alignment with fan 312 and vapor discharge passage 38. This variation reduces the overall height of apparatus 310. This variation also allows for replacement of power source 12 without removal of fan 312. More specifically, a hinged or otherwise movable cover 318 may be provided on shell 314 to permit direct access to power source 12 without removing fan 312.

In the fourth embodiment, as in the first through third embodiments, the reservoir 16 and the vaporizing element 18 are carried in a cartridge 40 removably mounted on the apparatus. As shown in FIGS. 16 and 18, cartridge 40 may be threadably connected to battery housing 28. Power source 12 is removable from housing 28 while cartridge 40 remains connected to housing 28 by removing fan 312 in FIGS. 15 and 16, or by opening cover 318 in the variation of FIGS. 17 and 18. Cartridge 40 can be unscrewed from housing 28 while power source 12 remains in battery housing 28. Like previous embodiments, cap 54 includes internal stopper 56 arranged to seal vapor discharge passage 38. In the variation of FIGS. 17 and 18, internal stopper 56 may be arranged on the underside of cover 318.

Figure 19:
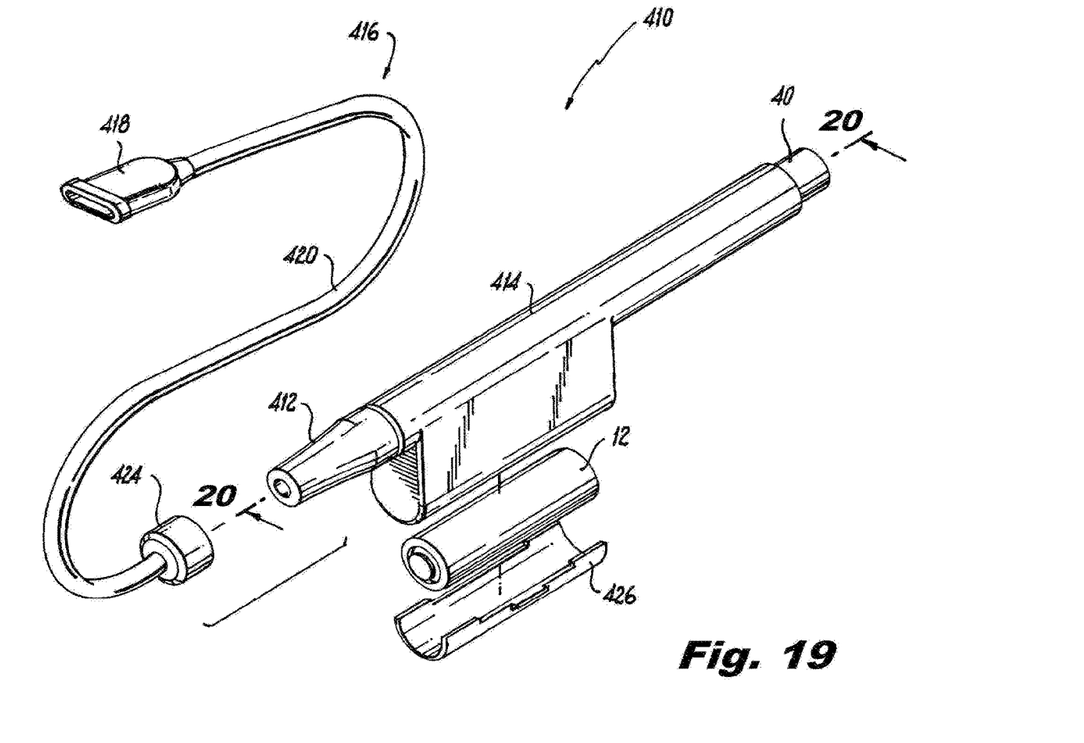
FIG. 19 is a perspective view of an air movement visualization apparatus formed in accordance with a fifth embodiment of the present invention.
Figure 20:
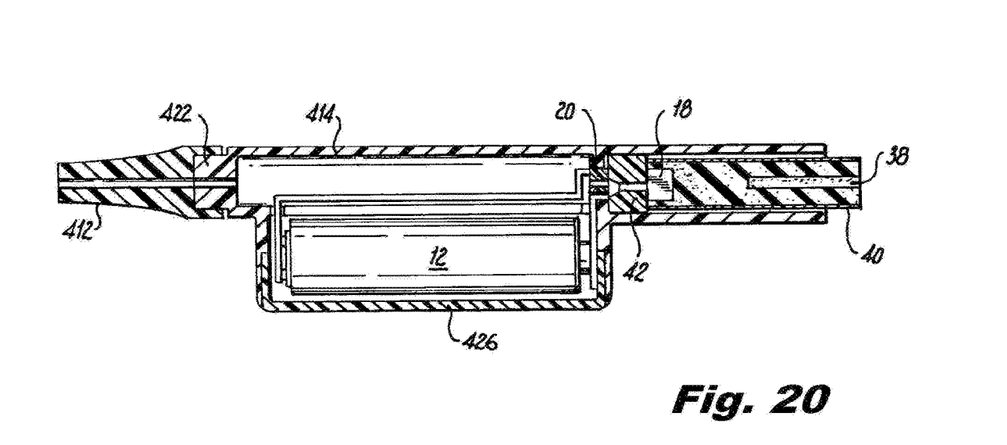
FIG. 20 is a cross-sectional view taken generally along the line 20-20 in FIG. 19.

FIGS. 19 and 20 show an air movement visualization apparatus 410 formed in accordance with a fifth embodiment of the present invention. Apparatus 410 operates by a user blowing into a mouthpiece 412 at one end of the apparatus. Mouthpiece 412 may be removable, for example by threaded or slidable mounting, from apparatus shell 414. A flexible mouthpiece attachment 416 may be provided having remote mouthpiece 418 communicating with original mouthpiece 412 or with an inlet port 422 of shell 414 through a flexible tube 420. Tube 420 may have an end fitting 424 for quick connection to original mouthpiece 412 or directly to inlet port 422. Flexible mouthpiece attachment 416 allows apparatus 410 to be freely orientated and viewed by the user while blowing into mouthpiece 412 so that the vapor stream may be viewed. Power source 12 is preferably located out of alignment with inlet port 422 and vapor discharge passage 38 to provide a clear path and facilitate actuation of pressure switch 20 by the user. Switch 20 may be connected to vaporizing element 18 by coupler 42 as described in connection with the first embodiment. Cartridge 40 may be threadably connected to coupler 42. A separate door 426 may be provided in shell 414 to allow access to power source 12.

Figure 21:
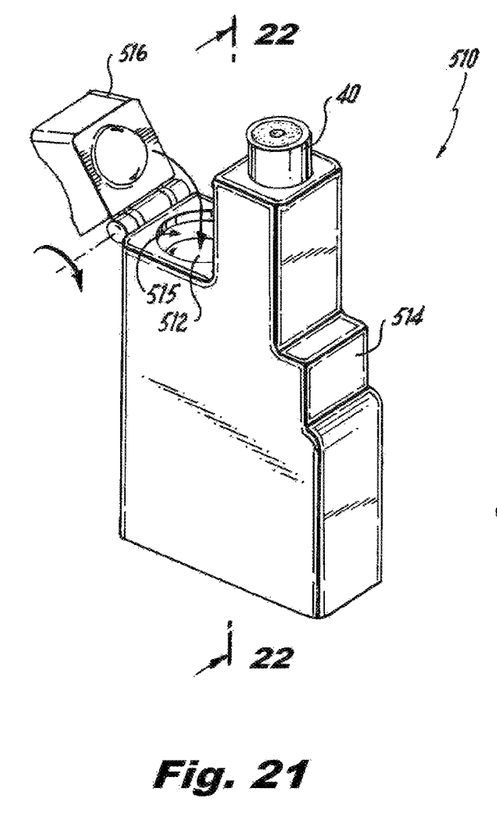
FIG. 21 is a perspective view of an air movement visualization apparatus formed in accordance with a sixth embodiment of the present invention.
Figure 22:
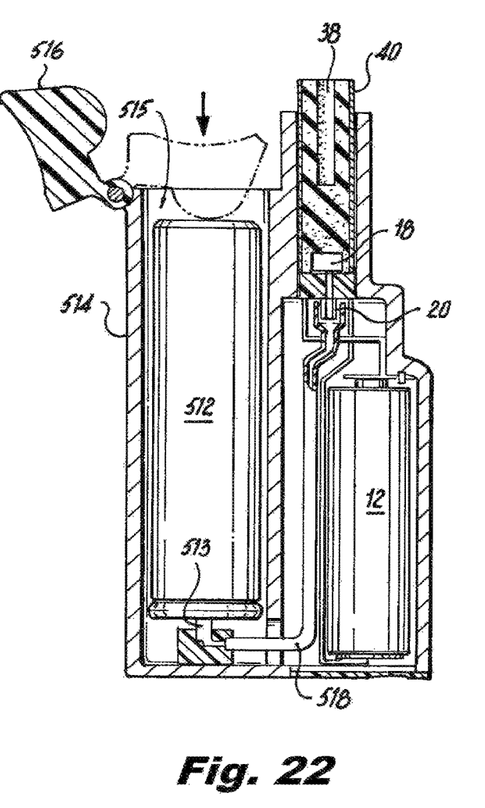
FIG. 22 is a cross-sectional view taken generally along the line 22-22 in FIG. 21.

An air movement visualization apparatus 510 formed in accordance with a sixth embodiment of the present invention is illustrated in FIGS. 21 and 22. Apparatus 510 includes a rigid container 512 holding pressurized gas, such as air. Container 512 includes a release valve 513 operable to release a flow of gas from the container. For example, in the embodiment shown, release valve 513 is opened by pressing container 512 in a downward direction as viewed in FIG. 22. An actuating member 516 may be provided at an end of container 512 opposite release valve 513, wherein the actuating member 516 may be pressed by a user to apply force to operate release valve 513. For example, actuating member 516 may be pivotally hinged to an outer shell 514 of apparatus 510.

Apparatus 510 may comprise a gas duct 518 arranged to communicate a flow of gas released through valve 513 to pressure switch 20, thereby activating the pressure switch to temporarily connect vaporizing element 18 to power source 12. As in the previous embodiments, the flow of gas carries vapor into the atmosphere as a vapor stream flowing in reference direction D.

When rigid container 512 loses its charge of pressurized gas, it may be replaced with a charged container by pivoting actuating member 516 back to allow container 512 to be withdrawn from a compartment 515 of apparatus shell 514 and the new container to be inserted into the compartment. A separate door (not shown) may be provided in shell 514 to allow access to power source 12.

As an optional feature applicable to all the embodiments described herein, vaporizable agent 22 may be scented. For example, vaporizable agent 22 may contain scents for luring deer and other animals, obscuring human scent, and/or repelling insects. Vaporizable agent 22 may also contain pleasing scents, such as scents produced by essential oils.

As another optional feature applicable to all embodiments, a safety shut-off switch may be provided to ensure that power source 12 is not drained down unnecessarily should pressure switch 20 or fan switch 316 fails to automatically shut off (where fan switch 316 is momentary), or where the user forgets to turn fan switch 316 off (where fan switch 316 is a locking on-off switch).

As a further optional feature applicable to all embodiments, a fuel gauge may be provided to indicate charge remaining in power source 12 or to indicate when remaining charge falls below a threshold level. For example, a blinking LED may be used to signal to the user that the charge remaining in power source 12 has dropped below a threshold level and the power source 12 should be recharged or replaced.

Embodiments of the present invention can include a small compact air movement indicator that could use an E-Cig as a component. This component could also be custom made with a liquid reservoir for the smoke producing fluid, a resistance heating device and a battery with the current actuated by a pressure switch, a push button switch or other switching means.

A unique part of this invention is the actuation by a means to produce air flow/air pressure change other than a user's lungs. This allows the device to be used without ingesting the smoke. This actuation means is produced by squeezing a flexible bulb or compressing air in a piston and cylinder arrangement. A pressurized air cartridge could also be employed and released by a manually or electronically actuated valve. The actuation of the air by such means would actuate the heating or atomizing means by a manual or electronic switching method. A piezo element could also be used to atomize said smoke fluid.

As a further embodiment a hand cranked charging unit could be employed to charge a batter or capacitor to produce electric power to run the smoke creating system. Additionally, in a more complex embodiment a ring of LEDS could encircle the smoke outlet and electronically read the wind direction.

This is not to be used as a replacement for smoking, it is used to determine wind direction for applications such as hunting, sailing, long range shooting, weather forecasting, tracking airborne toxins or contaminants after accidents or deliberate release and other reasons wherein determination of wind direction is typically useful. It can also be applied to sensing of fine interior air currents for visualization of air flow in a building, in duct work, around heating appliances or an air flow between rooms or multiple floors. Also valuable for use during construction to test the exterior/interior air seal of the building or to visualize existing air penetrations into an interior space. The device would offer a simple way to visualize the effectiveness of work.

In the case of hunting, the smoke could be scented and used to mask human odor or as an attractant for the hunted animal. The air bulb allows the smoke to be easily created on demand and in varying densities and frequencies.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

That which is claimed is:

1. A portable device for attracting an animal and/or masking human odor during hunting, said device comprising:
   a rechargeable battery;
   a replaceable cartridge carrying a scented liquid for attracting an animal or masking human odor; and
   an ultrasonic vaporizing element arranged in association with scented liquid and, when energized by the rechargeable battery, capable of vaporizing at least a portion of the scented liquid using ultrasonic vibrations.

2. The portable device of claim 1, wherein the vaporizing element is a piezoelectric element.

3. The portable device of claim 1, wherein the replaceable cartridge comprises an absorbent material holding at least a portion of the scented liquid near the vaporizing element.

4. The portable device of claim 1, further comprising a push button switch for manually actuating the vaporizing element.

5. The portable device of claim 1, wherein the scented liquid is an animal attractant for luring deer.

6. The portable device of claim 1, further comprising a charge indicator for providing an indication of the level of charge of the battery, wherein the charge indicator comprises an LED.

7. The portable device of claim 1, further comprising a housing having a removable base, wherein the battery is received in the housing, wherein the battery is removable from the housing upon removal of the base.

8. The portable device of claim 7, wherein the cartridge is removably connected to the housing, wherein the battery is removable from the housing while the cartridge remains connected to the housing, wherein the cartridge is removable from the housing while the battery remains in the housing.

9. The portable device of claim 1, wherein the cartridge includes an absorbent material, a threaded end portion, and an electrical connection near the threaded end portion.

10. The portable device of claim 1, further comprising a switch for selectively connecting the vaporizing element to the rechargeable battery to thereby energize the vaporizing element.

11. The portable device of claim 10, wherein the switch is a push button switch.

12. The portable device of claim 10, wherein the switch is a momentary switch configured to briefly energize the vaporizing element and then shut off power after a brief predetermined period of time.

13. The portable device of claim 12, wherein the momentary switch comprises an integrated microprocessor.

14. The portable device of claim 1, further comprising a shell having a base, wherein the battery, cartridge, and vaporizing element are at least partly received in the shell, wherein the base is removable.

15. The portable device of claim 1, wherein the battery and the cartridge are independently removable and replaceable, further comprising a switch for selectively connecting the vaporizing element to the rechargeable battery, wherein the switch is a push button switch or a momentary switch, further comprising a charge indicator for providing an indication of the level of charge of the rechargeable battery.

16. The portable device of claim 1, wherein the portable device has at least one of the following features—
    (i) the portable device includes only one battery;
    (ii) the portable device includes only one cartridge;
    (iii) the portable device includes a fan for generating air flow;
    (iv) the portable device includes a deformable vessel for generating air flow;
    (v) the portable device includes a pressure switch actuated by air flow;
    (vi) the vaporizing element is part of the cartridge.

17. The portable device of claim 1, wherein said vaporizing atomizes at least a portion of the scented liquid and disperses the atomized liquid in the air.

18. A portable device for attracting an animal and/or masking human odor during hunting, said device comprising:
    a housing comprising a removable base;
    a battery at least partially received in the housing and removable from the housing when the base is removed;
    a replaceable cartridge removably connected to the housing, wherein the cartridge carries a scented liquid for attracting an animals or masking human odor; and
    a piezoelectric atomizing element arranged in association with the scented liquid and, when energized by the battery, capable of atomizing at least a portion of the scented liquid using ultrasonic vibrations.

19. The portable device of claim 18, further comprising a manual switch for selectively connecting the battery and the atomizing vaporizing element.

20. The portable device of claim 19, wherein the manual switch is a push button switch.

21. The portable device of claim 20, wherein the push button switch is coupled to the housing.

22. The portable device of claim 18, further comprising a momentary switch configured to briefly energize the atomizing element and then shut off power after a brief predetermined period of time, wherein the momentary switch comprises an integrated microprocessor located within the housing.

23. The portable device of claim 18, further comprising a push button switch for manually actuating the atomizing element and a momentary switch for automatically actuating the atomizing element for a brief predetermined period of time.

24. The portable device of claim 18, wherein the battery is removable from the housing upon removal of the base, wherein the cartridge is removably connected to the housing, wherein the battery is removable from the housing while the cartridge remains connected to the housing, wherein the cartridge is removable from the housing while the battery remains in the housing.

25. The portable device of claim 18, wherein the cartridge comprises an absorbent material holding at least a portion of the scented liquid, a threaded end portion, and an electrical connection near the threaded end portion.

26. The portable device of claim 18, wherein the scented liquid is an animal attractant for luring deer.

27. The portable device of claim 18, wherein the battery is rechargeable, further comprising a charge indicator for providing an indication of the level of charge of the battery, wherein the charge indicator comprises an LED.

28. The portable device of claim 18, wherein the portable device has at least one of the following features—
    (i) the portable device includes only one battery;
    (ii) the portable device includes only one cartridge;
    (iii) the portable device includes a fan for generating air flow;
    (iv) the portable device includes a deformable vessel for generating air flow;
    (v) the portable device includes a pressure switch actuated by air flow;
    (vi) the atomizing element is part of the cartridge;
    (vii) the cartridge is not received in the housing;
    (viii) the base is threadably received at the bottom of the housing.

29. A hunting method comprising: selectively actuating a piezoelectric element of a portable device to thereby discharge a scented vapor stream into the atmosphere, wherein during said actuating the piezoelectric element vaporizes a scented liquid using ultrasonic vibrations, wherein the scented liquid is for attracting an animal or masking human odor, wherein the portable device comprises a battery and a liquid reservoir for the scented liquid, wherein the battery provides power to the piezoelectric element during said actuating.

30. The hunting method of claim 29, wherein said actuating is carried out for a brief predetermined period of time and then is automatically shut off.

31. The hunting method of claim 29, further comprising varying the frequency of said actuating.

32. The hunting method of claim 29, wherein the piezoelectric element atomizes the scented liquid using ultrasonic vibrations so that the scented vapor stream is an atomized stream.

\* \* \* \* \*